US008913955B1

(12) United States Patent
Mincher (10) Patent No.: US 8,913,955 B1
(45) Date of Patent: Dec. 16, 2014

(54) MAGNETICALLY INITIATED DEVICE PAIRING

(71) Applicant: Amazon Technologies, Inc., Reno, NV (US)

(72) Inventor: Richard W. Mincher, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 163 days.

(21) Appl. No.: 13/621,679

(22) Filed: Sep. 17, 2012

(51) Int. Cl.
*H04B 5/00* (2006.01)

(52) U.S. Cl.
USPC ........................................ 455/41.1; 455/41.2

(58) Field of Classification Search
CPC ............................. H04W 84/18; H04W 12/06
USPC .......... 455/41.2, 41.1, 39, 422.1; 709/227, 228
See application file for complete search history.

(56) References Cited

U.S. PATENT DOCUMENTS

| | | | |
|---|---|---|---|
| 2007/0070035 A1* | 3/2007 | Asbury et al. | 345/156 |
| 2011/0106954 A1* | 5/2011 | Chatterjee et al. | 709/227 |
| 2013/0219303 A1* | 8/2013 | Eriksson et al. | 715/759 |

* cited by examiner

*Primary Examiner* — Sonny Trinh
(74) *Attorney, Agent, or Firm* — Sutherland Asbill & Brennan LLP (57) ABSTRACT

Described herein are systems and methods for initiating the establishment of a communication link between two devices which have complementary magnets and magnetic field sensors. When the two devices are brought together, the magnetic field from the opposing device is detected with a magnetic sensor. Based on the detection, an establishment process is initiated on each of the devices. The process may proceed and establish the communication link.

23 Claims, 10 Drawing Sheets

FIG. 1

202 USER PLACES A SECOND DEVICE PROXIMATE TO A TRIGGER AREA ON A FIRST DEVICE

204 BASED AT LEAST IN PART ON DETECTING A MAGNETIC FIELD FROM THE SECOND DEVICE, THE FIRST DEVICE INITIATES A PAIRING PROCESS

206 BASED AT LEAST IN PART ON DETECTING A MAGNETIC FIELD FROM THE FIRST DEVICE, THE SECOND DEVICE INITIATES A PAIRING PROCESS

208 BASED AT LEAST IN PART ON THE SECOND DEVICE AND THE FIRST DEVICE INITIATING THE PAIRING PROCESS, PAIR THE FIRST DEVICE AND THE SECOND DEVICE.

210 BASED AT LEAST IN PART ON THE PAIRING, TRANSFER DATA BETWEEN THE FIRST DEVICE AND THE SECOND DEVICE

MAGNETICALLY INITIATED DEVICE PAIRING

BACKGROUND

Devices with wireless communication interfaces may communicate with one another using a common protocol. Many protocols such as Bluetooth, Zigbee, and so forth may utilize a link establishment process during which two or more devices are "paired" or "bonded" to one another. Traditionally, initiating this link establishment process involves a series of actions on the part of the user, such as pressing a particular button for a period of time, starting a discovery process, and so forth. These actions may be inconvenient to the user and may result in an adverse user experience.

Certain implementations will now be described more fully below with reference to the accompanying drawings, in which various implementations and/or aspects are shown. However, various aspects may be implemented in many different forms and should not be construed as limited to the implementations set forth herein. Like numbers refer to like elements throughout.

DETAILED DESCRIPTION

Devices communicate with one another using various wireless protocols such as Bluetooth, Zigbee, and so forth. To establish a communication link between two devices it may be necessary to initiate some sort of setup procedure or "pairing" so the devices recognize one another and can be configured to exchange data with one another. For example, with Bluetooth the user typically has to initiate a pairing process by pressing a particular button, initiating a command, and so forth. This manual intervention may be inconvenient for a user, resulting in an undesired user experience. For example, the pairing initiation buttons may be concealed, in difficult to access locations such as in a battery compartment, may be physically small and difficult to activate, and so forth.

Described in this disclosure are devices and methods for initiating the pairing between two devices based on their mutually detected proximity to one another. The proximity may be determined using complementary magnets and magnetic sensors in the two devices. In one implementation, each of the devices may contain a magnet in a first location and a magnetic sensor in another location, set apart from one another. When the two devices are brought together in complementary fashion, the magnetic field from the first device is detected by the magnetic sensor in the second device, and vice versa. Upon detection, of the magnetic field by the magnetic sensor the pairing process is initiated within each of the devices. In other implementations other techniques may be used to determine proximity and initiate the pairing process. Infrared signals, acoustic signals, capacitive proximity sensors, radio frequency identification tags, near field communication devices, and so forth may be used to determine proximity of the two devices to one another. Instead of a user pressing various buttons to start the pairing process, the user places the devices near one another, such as placing the second device atop the first device. The first and second devices may have physically complementary shapes such that at least a portion of one may rest or nest within another. For example, the first device may have a declivity or recess within which the second device may sit. The magnets and magnetic sensors may be arranged such that when placed in the recess, the magnetic sensors detect the corresponding magnetic field from a magnetic in the other device and, based on that detection, may initiate the pairing process.

The orientation with which the first and second devices are placed relative to one another may be used to perform different actions. For example, in a first orientation the pairing may be triggered, while a second orientation may trigger one or both of the devices to enter a lower power mode.

The magnets may also be used to hold the first and second devices together. For example, the magnets may provide a field for detection by the magnetic sensor as well as providing a physically attractive force to ferrous material in the other device. This physical attraction may be used to hold the devices together.

Illustrative System

Figure 1:
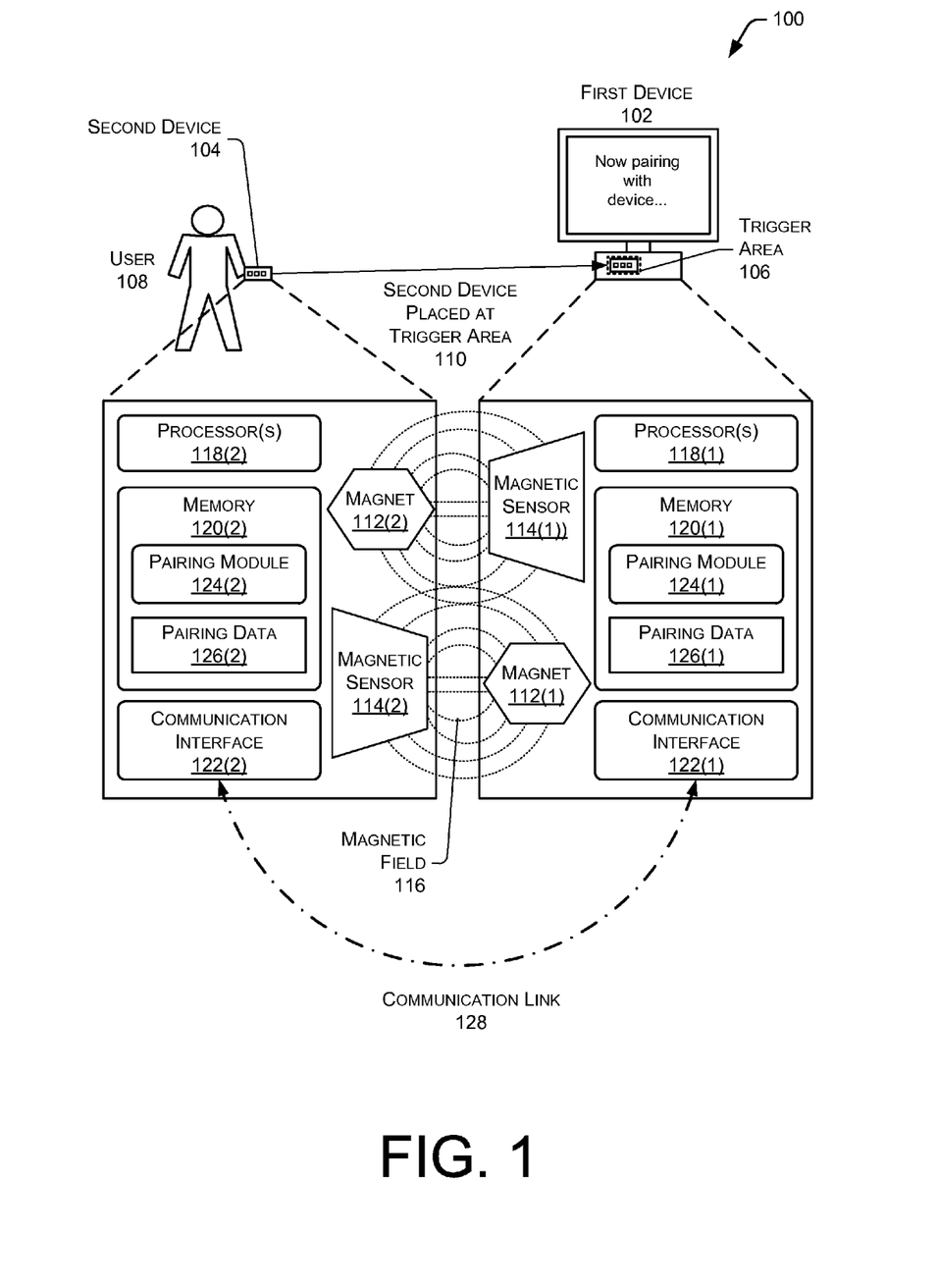
FIG. 1 illustrates a system for magnetically initiating device pairing between a first and second device.

FIG. 1 illustrates a system 100 for magnetically initiating device pairing between a first and second device. The devices may include televisions, broadcast satellite receivers, broadcast radio receivers, cable television interface boxes, set-top box, game consoles, digital versatile disk ("DVD") players, Blu-ray™ players, compact disk ("CD") players, in-vehicle entertainment systems, smartphones, telephones, tablet computers, and so forth. A first device 102 such as a television is depicted. A second device 104 such a remote control is also depicted. The first device 102 and the second device 104 may comprise other devices such as a tablet computer and wireless headphones, respectively.

The first device 102 and the second device 104 may be configured to communicate with one another wirelessly using a communication link. This communication link may be established through a pairing or bonding process in which the first device 102 and the second device 104 work in conjunction with one another.

As described herein, the first device 102 is configured with a trigger area 106. The trigger area 106 is a particular portion of the first device 102 which is configured with one or more magnets and magnetic sensors. A user 108 may place 110 the second device 104 at the trigger area 106. Upon detecting a magnetic field from the second device 104 which is proximate to the trigger area 106, the first device 102 initiates the pairing process. As described below in more detail with regard to FIG. 4, the trigger area 106 may comprise various shapes or contours which may be configured to be physically complementary to a shape or contour of the second device 104.

As illustrated here, the first device 102 and the second device 104 may comprise the following elements. While the first device 102 and the second device 104 are depicted with the same elements, in some implementations the composition of the first device 102 may vary from the second device 104.

The devices may comprise one or more magnets 112 and one or more magnetic sensors 114. The magnets 112 may comprise a permanent magnet, an electromagnet, or an electro-permanent magnet. The magnets 112 are configured to produce a magnetic field 116. The magnetic field 116 may be static such as in the case of a fixed permanent magnet. In some implementations the magnetic field 116 may be dynamic as in the case of a moving permanent magnet or an electromagnet. In some implementations, the magnetic field may be modulated to encode data. For example, an electromagnet may be configured to vary the field strength or polarity such that data is transmitted by changes in the magnetic field 116. The magnets 112 are discussed in more detail below in FIG. 3.

The magnetic sensors 114 use one or more of a reed switch, a Hall-effect sensor, a microelectromechanical system magnetic sensor ("MEMS"), a magnetic tunnel junction, or other device capable of detecting presence of an impinging magnetic field 116. In some implementations the magnetic sensor 114 may provide an indication as to whether the magnetic field 116 is impinging on the sensor. For example, a reed switch indicates presence of a magnetic field 116 having a flux above a particular threshold value.

In comparison, in some implementations the magnetic sensor 114 may be configured to provide additional information about the magnetic field 116, such as vector data. For example, a Hall-effect device may be configured to provide details about the polarity and relative direction of the magnetic field 116. The magnetic sensor 114 may be configured to determine changes in the magnetic field, such as frequency, polarity, and so forth. The magnetic sensor 114 may thus be able to acquire a modulated magnetic signal from the magnet 112 of the counterpart device.

In some implementations a combination of different types of magnetic sensors 114 may be used in the device. For example, a reed switch may be used to determine presence of the magnetic field 116 while a Hall-effect device is configured to provide directional information. The magnetic sensors 114 are discussed in more detail below in FIG. 3.

As depicted here, the magnets 112 and the magnetic sensors 114 are mounted on or within the first device 102 and the second device 104. These elements are arranged such that, when brought into proximity with one another, each of the magnetic sensors 114 detects an impinging magnetic field 116 from the opposite device. For example, the magnetic sensor 114(1) of the first device 102 detects the magnetic field 116 of the magnet 112(2) in the second device 104. Likewise, the magnetic sensor 114(2) of the second device 104 detects the magnetic field 116 of the magnet 112(1) in the first device 102.

In some implementations other sensors may be used instead of, or in addition to, the magnets 112 and the magnetic sensor 114. A capacitive, optical, proximity sensor may be used in each device to initiate the pairing process on the respective device.

The devices may comprise one or more processors 118, one or more memories 120, and one or more communication interfaces 122. In some implementations these elements may differ between the devices. For example, the first device 102 may use a complex-instruction set processor 118(1) while the processor 118(2) of the second device 102 may comprise a microcontroller.

The processor 118 may comprise one or more cores and is configured to access and execute at least in part instructions stored in the one or more memories 120. The one or more memories 120 comprise one or more computer-readable storage media ("CRSM"). The one or more memories 120 may include, but are not limited to, random access memory ("RAM"), flash RAM, magnetic media, optical media, and so forth. The one or more memories 120 may be volatile in that information is retained while providing power or non-volatile in that information is retained without providing power.

The one or more communication interfaces 122 provide for the transfer of data between the first device 102 and the second device 104. The communication interface 122 may be configured to couple to a wireless local area network ("WLAN"), a personal area network ("PAN") such as Bluetooth™, wireless wide area network ("WWAN"), and so forth. The communication interface 122 may be configured to operate using optical or radio frequencies. For example, the communication interface 122 may comprise an optical transceiver using visible or infrared light. In some implementations, the communication interface 122 may be configured to modulate and demodulate the magnetic fields 116 as described above.

In other implementations other devices or components may be coupled to or incorporated within the devices, such as input/output devices. For example, the first device 102 may include a visual display to present image content while the second device 104 may include buttons to accept user input.

The one or more memories 120 may store code or program instructions for execution by the processor 118 to perform certain actions or functions. In some implementations at least a portion of the instructions may be stored in external memory accessible to the device, such as on a server or another device.

These instructions in the one or more memories 120 may include an operating system. The operating system is configured to manage hardware resources and provide various services to applications executing on the processor 118. The one or more memories 120 may also store a datastore containing information. This information may include encryption keys, device identifiers, and other data. The datastore may comprise a database, flat file, linked list, or other data structure.

The one or more memories 120 may include a pairing module 124 and pairing data 126. The pairing module 124 is configured to initiate a pairing process or procedure based at least in part upon receiving a signal. The pairing process comprises establishment of a wireless communication link between two or more devices. The pairing module 124 may be configured to establish frequencies for communication, exchange encryption information, and so forth. Once the pairing process is complete, other modules in the device may communicate using the communication link.

The signal received by the pairing module 124 to initiate the pairing process is the detection of the magnetic field 116 at the magnetic sensor 114. As described above, presence of a nearby magnet 112 may result in this signal. In other implementations, the signal may be generated by a button press, user selection from a menu, proximity sensor, and so forth.

In some implementations the pairing module 124 may be configured to set one or more conditions based on data received from the magnetic sensor 114. For example, the pairing module 124 may be configured to initiate pairing after receiving data that the magnetic field 116 has a particular polarity, field strength, and so forth.

The pairing module 124 may store pairing data 126. The pairing data 126 may include data such as channel selection, data rate, identification of the other device, encryption information, and so forth. In some implementations the pairing data 126 may be stored in the datastore described above.

The communication interface 122(1), using the pairing module 124 and the pairing data 126 establishes a communication link 128 between the devices. Once the communication link 128 is available, data may be transferred between the first device 102 and the second device 104.

In some implementations the first device 102 and the second device 104 may be configured to wirelessly exchange energy for charging or operation of the other device. For example, the first device 102 may include an inductive charging component which provides an electromagnetic field which a corresponding inductive charging component in the second device 104 is able to convert into electrical energy for use by the second device 104. In some implementations the inductive charging components may be configured to provide proximity data indicating that the two devices are near one another. This proximity data may be Furthermore, the inductive charging components may be configured to generate modulated signals suitable for use as the communication link 128.

The illustrations in this application depict two devices. In some implementations more than two devices may use magnetically initiated pairing to establish the communication link 128. As shown above, the use of the complementary arrangement of the magnets 112 and the magnetic sensors 114 between the first device 102 and the second device 104 provide a simple user interface to initiate pairing between the communication interfaces 122, which may improve the user experience.

Figure 2:
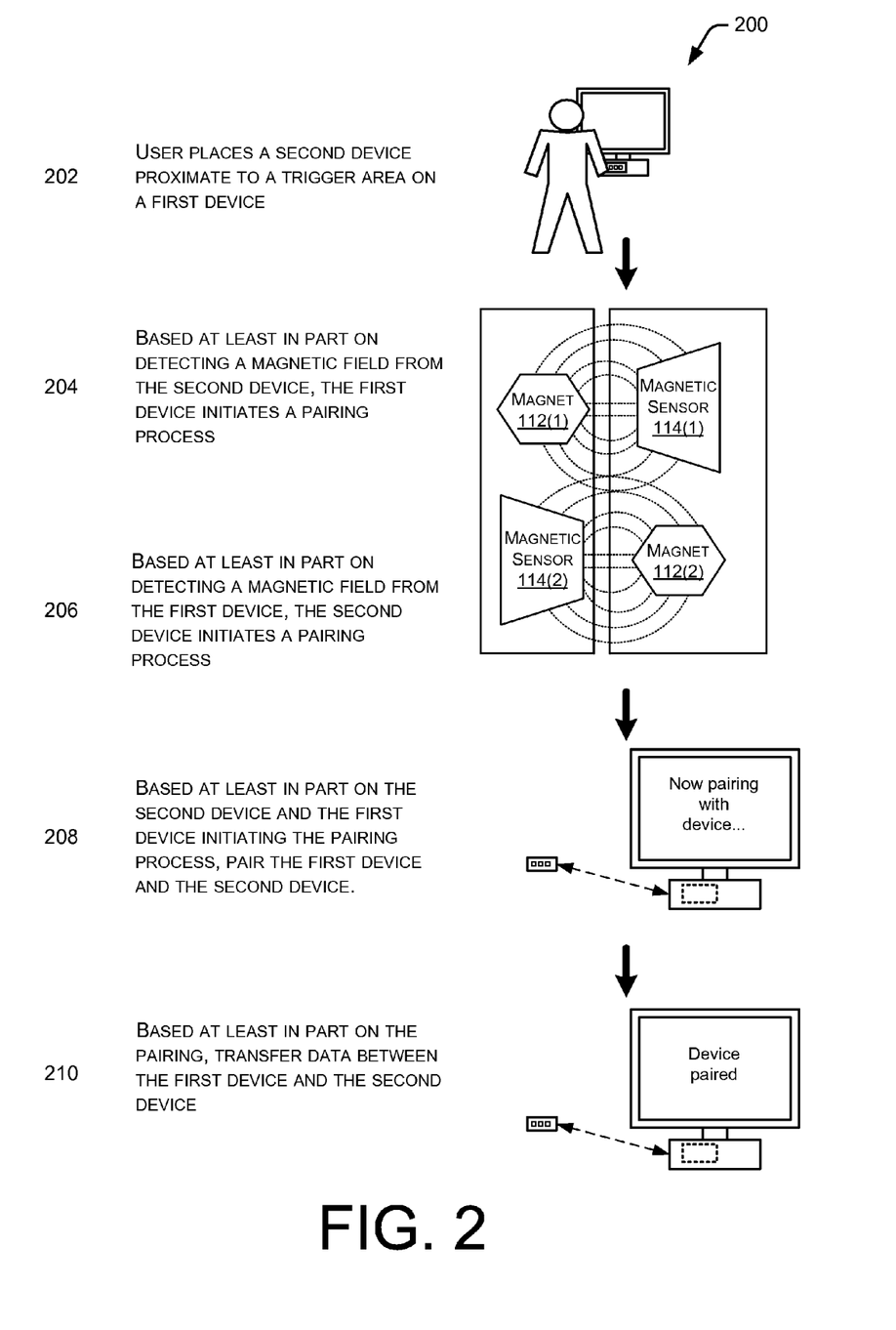
FIG. 2 illustrates a series of operations in which device pairing is initiated magnetically between the first and second device.

FIG. 2 illustrates a series of operations 200 in which device pairing is initiated magnetically between the first device 102 and the second device 104. At 202 a user 108 places the second device 104 proximate to the trigger area 106.

At 204, based at least in part on detecting the magnetic field 116 from the second device 104, the first device 102 initiates a pairing process. For example, the detection may be used at the signal which starts the activity of the pairing module 124.

At 206, based at least in part on detecting the magnetic field 116 from the first device 102, the second device 104 initiates a pairing process.

In other implementations the proximity of the first device 102 to the second device 104 may be determined using emissions other than magnetic fields generated by the magnets 112 as received by sensors other than the magnetic sensors 114. For example, pairs of optical emitters and sensors may be used instead of, or in addition to, the magnets 112 and the magnetic field sensors 114. These other emitters and sensors are described below in more detail with regard to FIG. 7.

Block 208, based at least in part on the second device 104 and the first device 102 initiating the pairing process, pairs the first device and the second device. For example, the communication interfaces 122(1) and 122(2) may establish a Bluetooth™ or Zigbee PAN communication link 128.

Block 210, based at least in part on the pairing, transfers data between the first device 102 and the second device 104. This transfer of data may be bidirectional, further allowing data to be exchanged.

Figure 3:
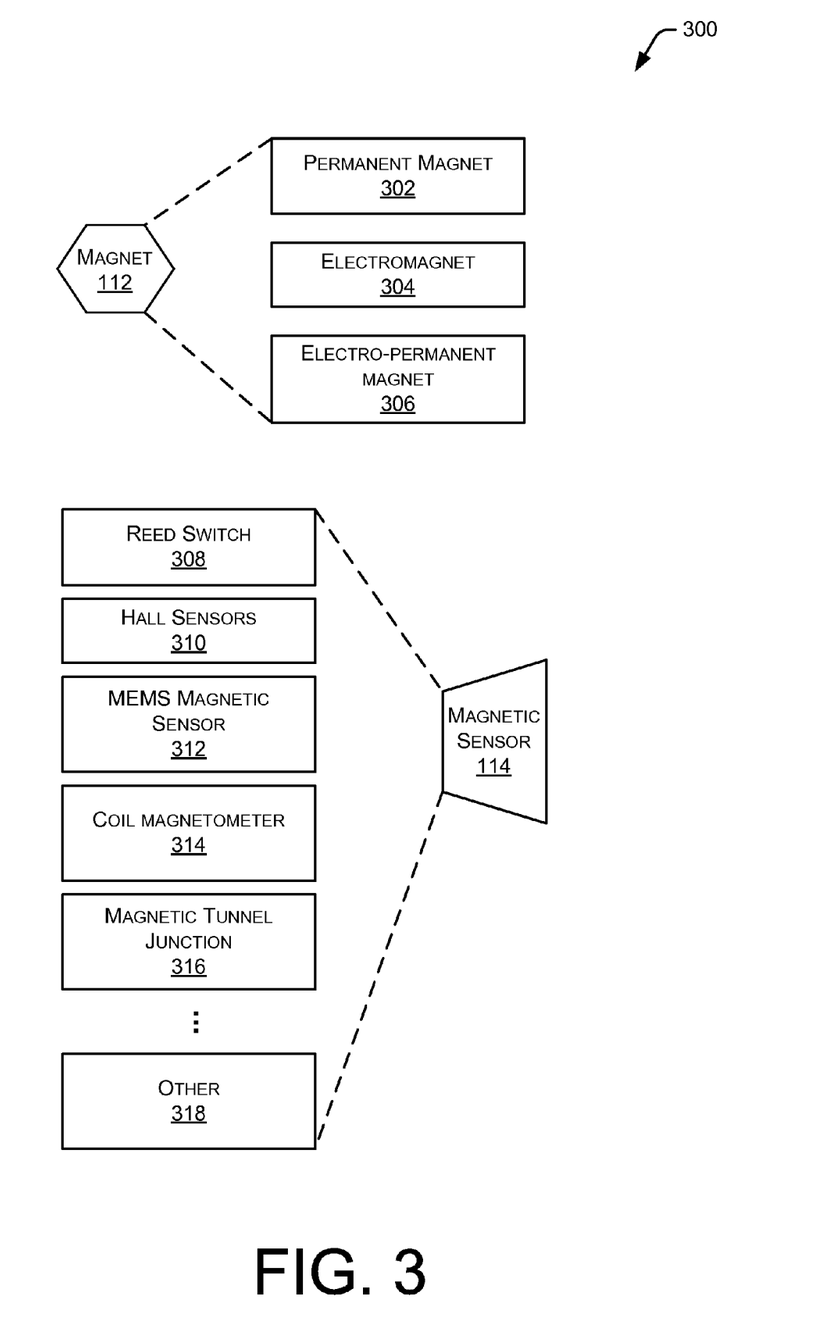
FIG. 3 illustrates block diagrams of the magnet and magnetic sensor.

FIG. 3 illustrates block diagrams 300 of the magnet 112 and the magnetic sensor 114. The magnets 112 may comprise a permanent magnet 302, an electromagnet 304, or an electro-permanent magnet 306. The permanent magnet 302 may comprise a ferromagnetic material including, but not limited to iron, nickel, cobalt, or rare earth metals. The electromagnet 304 may comprise one or more wires wrapped around an air core or an iron core. An electro-permanent magnet 306 may comprise a permanent magnet 302 and an electromagnet 304. The electromagnet 304 or the electro-permanent magnet 306 may be configured such that a modulated magnetic field is produced. In other implementations, other magnetic field sources may be used.

The magnetic sensor 114 may comprise devices configured to detect or generate data in response to an impinging magnetic field 116. The magnetic sensor 114 may include one or more of a reed switch 308, a Hall-effect sensor ("Hall sensor") 310, a microelectromechanical system magnetic sensor ("MEMS") 312, a coil magnetometer 314, a magnetic tunnel junction 316 solid-state device, or other device 318 such as a fluxgate magnetometer.

Figure 4:
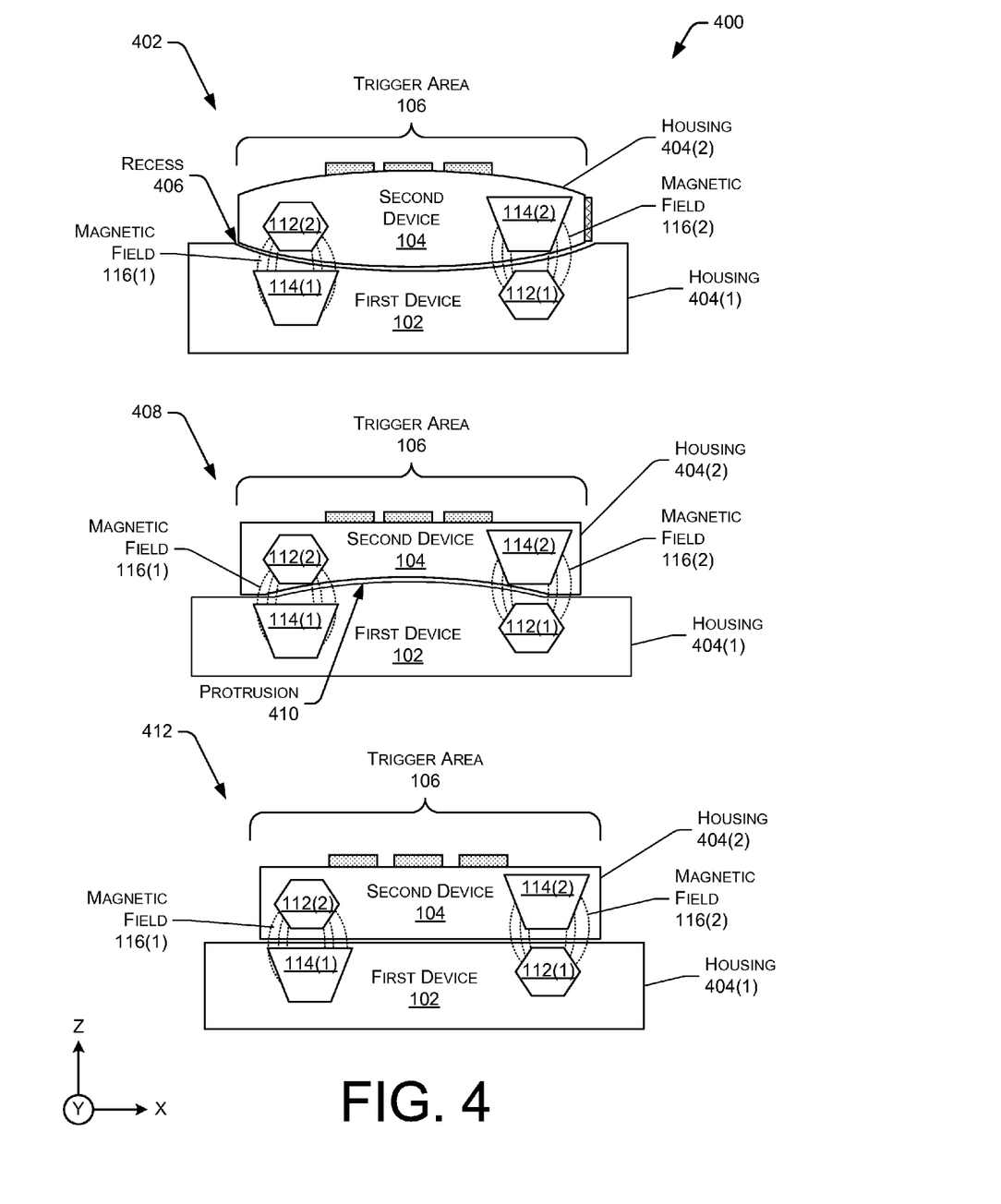
FIG. 4 illustrates cross sectional views of three implementations of the first device and the second device.

FIG. 4 illustrates cross sectional views 400 of three implementations of the first device 102 and the second device 104. As described above, the first device 102 and the second device 104 may be configured such that the magnets 112 and the magnetic sensors 114 work in conjunction with one another.

To facilitate definition of the trigger area 106, in some implementations the first device 102, the second device 104, or both may have surface features configured to aid in placement of the second device 104 into the trigger area 106. A first implementation 402 is shown with the first device 102 having a portion of a housing 404(1) within which a recess 406, declivity, receptacle, or other substantially concave feature is present to define the trigger area 106.

The housing 404 may comprise a material which is permeable to the magnetic field 116, such as a plastic, ceramic, non-ferrous metal, and so forth. The second device 104 may be configured with a housing 404(2) having a corresponding shape or contour, compatible with the recess 406. For example, as shown here a housing of the second device 104 may have a convex shape to complement the recess 406 of the first device 102.

As shown, the recess 406 and the placement of the magnets 112 and the magnetic sensors 114 are configured to define the trigger area 106 such that when a portion of the second device 104 is placed in the recess 406, the one or more magnetic sensors 114(1) detect the magnet 112(2) associated with the second device 104. Likewise, the one or more magnetic sensors 114(2) detect the magnet 112(1) associated with the first device 102.

In a second implementation 408, the housing 404(1) of the first device 102 may be configured with a protrusion 410 or other convex feature to aid in defining the trigger area 106. As above, the housing 404(2) of the second device 104 may be configured with a complementary feature such as a recess or concavity.

In a third implementation 412, the housing 404(1) of the first device 102 may be configured as a planar or flat surface. Similarly the second device 104 may be configured with a planar or flat surface.

While the first device 102 and the second device 104 are depicted here with complementary housings 404(1) and 404(2), in some implementations non-complementary shapes may be used. For example, the second device 104 may have a curved underside as shown above with regard to 402 and be used in conjunction with the planar implementation shown at 412.

Figure 5:
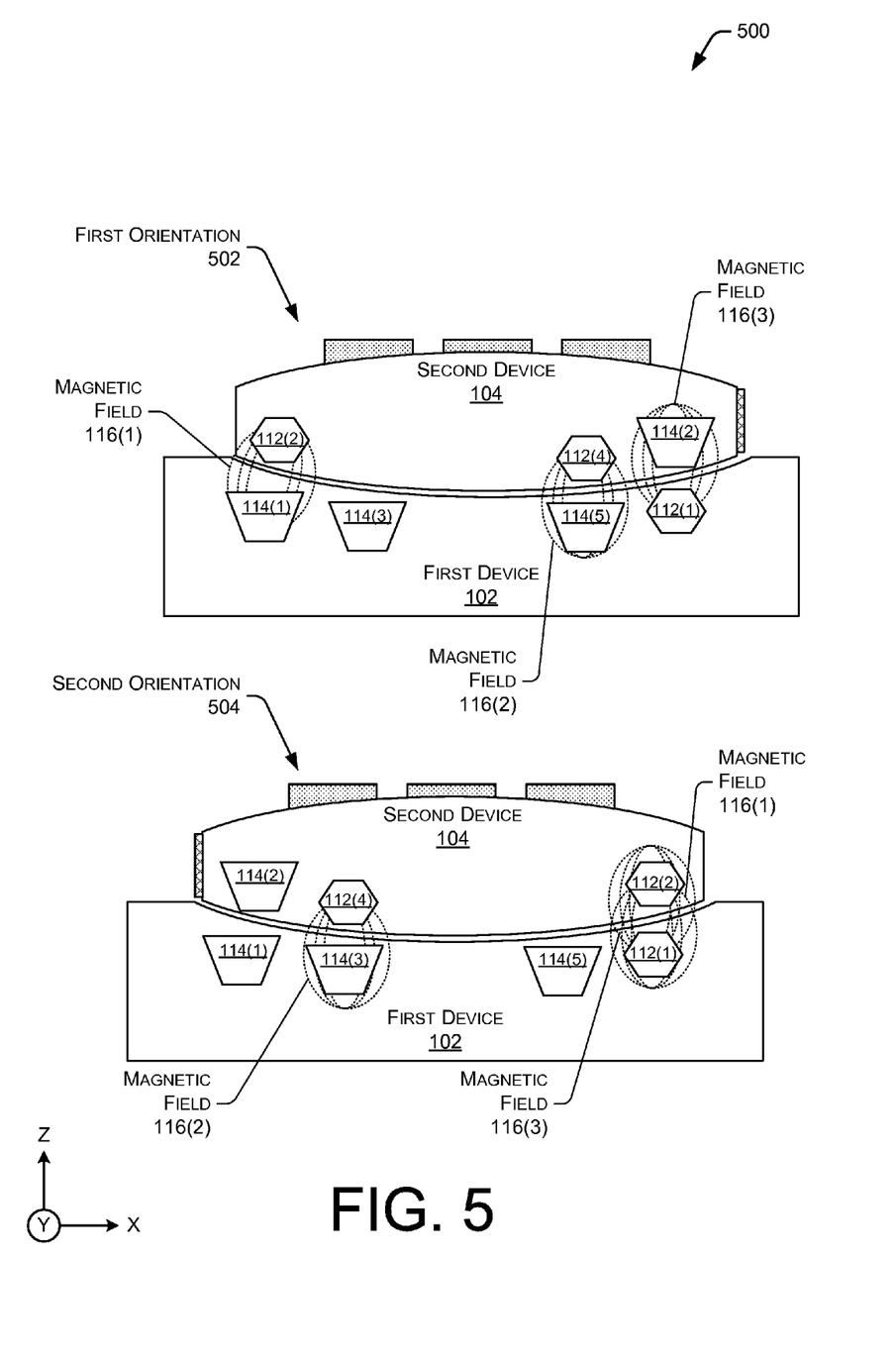
FIG. 5 illustrates a cross sectional view of the first device and the second device as configured to determine relative orientation between the devices.

FIG. 5 illustrates a cross sectional view 500 of one implementation of the first device 102 and the second device 104 as configured to determine relative orientation between the devices. The relative orientation describes the spatial relationship between the first device 102 and the second device 104. For example, in a first orientation the first device 102 and the second device 104 may both be oriented such that they are both facing the same direction. In some implementations, different relative orientations may be used to initiate different actions. For example, a first orientation may initiate the pairing process while a second orientation may place one or both of the devices into a low power mode. The relative orientation may be determined based at least in part on the magnetic field 116 as detected by the magnetic sensor 114.

The first device 102 and the second device 104 may have a plurality of magnets 112 and magnetic sensors 114 configured to provide orientation data. As illustrated here, the magnets 112 and the magnetic sensors 114 may be asymmetrically arranged relative to one another. For example, the first device 102 comprises three magnetic sensors 114(1), 114(3), and 114(5). The magnetic sensors 114(1) and 114(3) are proximate to a rear edge of the first device 102. The magnet 112(1) and the magnetic sensor 114(5) are proximate to a front edge of the first device 102. The second device 104 is configured with the magnet 122(2) proximate to the rear edge, while the magnet 112(4) and the magnetic sensor 114(2) are proximate to the front edge.

In this first orientation 502, the magnetic fields 116 of the magnets 112(2), 112(4), and 112(1) impinge upon the magnetic sensors 114(1), 114(5), and 114(2), respectively. No magnetic field 116 impinges on the magnetic sensor 114(3).

In comparison, in a second orientation 504 the second device 104 has been placed in an orientation 180 degrees from the first orientation 502. In this orientation, the magnetic field 116(2) of the magnet 112(4) now impinges on the magnetic sensor 114(3) only. By analyzing the pattern of which magnetic sensors 114 detect a magnetic field, the pairing module 124 or another module may determine the orientation of the second device 104 relative to the first device 102.

Figure 6:
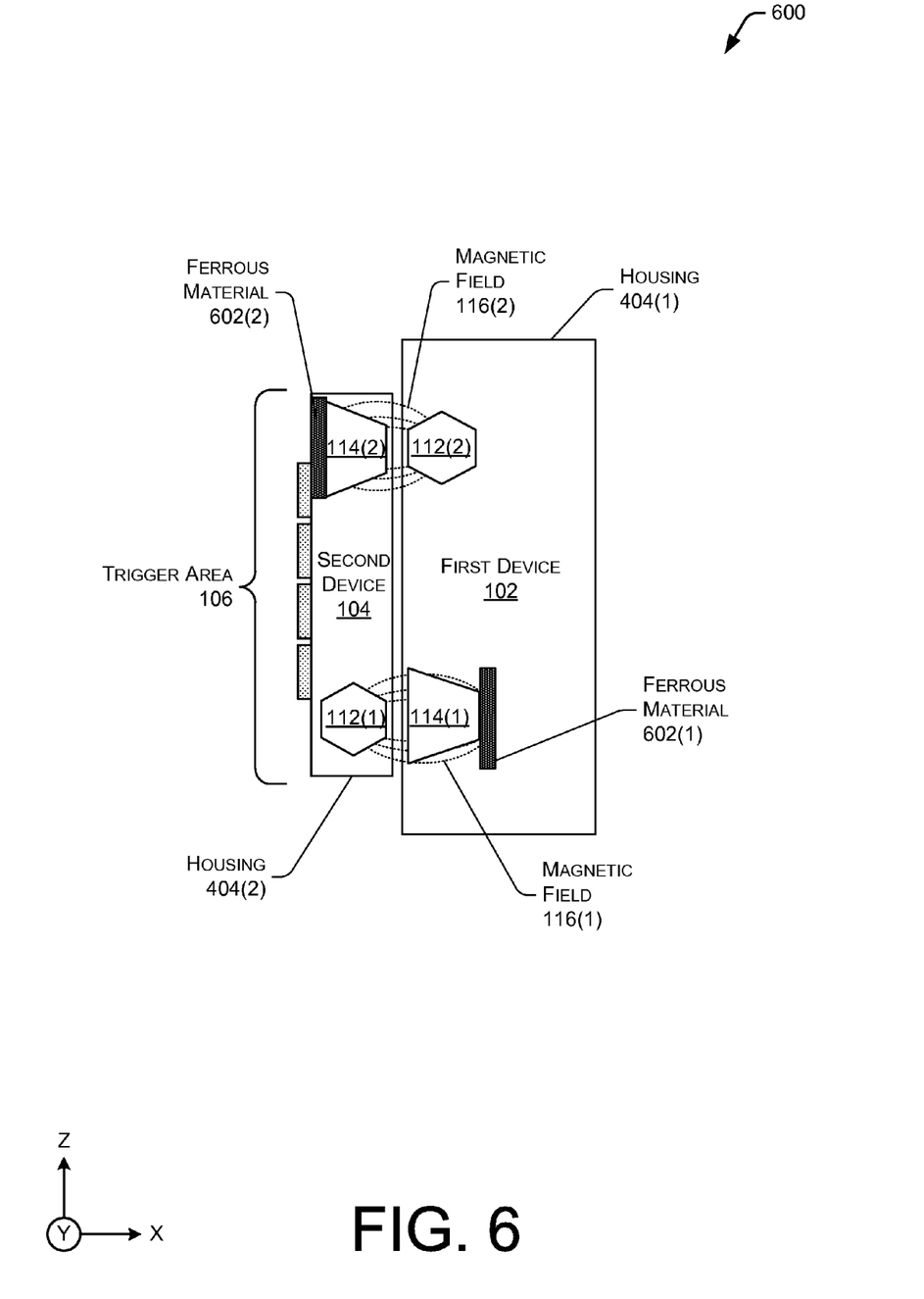
FIG. 6 illustrates a cross sectional view of the first device and the second device configured to initiate device pairing magnetically and magnetically hold the devices together.

FIG. 6 illustrates a cross sectional view 600 of one implementation of the first device 102 and the second device 104 configured to initiate device pairing magnetically and magnetically hold the devices together. In some implementations the first device 102 and the second device 104 may be configured to adhere or stick to one another. This may be used to aid in retaining the second device 104 next to the first device 102.

In this illustration, the first device 102, the second device 104, or both may include one or more components with ferrous material 602, such as iron. These ferrous materials 602 may be attracted by the one or more magnets 112, providing an adhesion or joining force. In some implementations the magnets 112 may be designated solely for use in generating a magnetically attractive force.

As depicted here, the first device 102 may comprise a piece of ferrous material 602(1) such as steel arranged adjacent to the magnetic sensor 114 such that, when the second device 104 is placed in the trigger area 106, the magnet 112(1) will exhibit magnetic attraction to the ferrous material 602(1).

Similarly, another piece of ferrous material 602(2) may be arranged adjacent to the magnetic sensor 114(2) such that, when the second device 104 is placed in the trigger area 106, the magnet 112(2) will exhibit magnetic attraction to the ferrous material 602(2). In some implementations the ferrous material 602 may comprise a portion of a chassis within the housing 404. For example, the first device 102 may include one or more steel chassis components.

Figure 7:
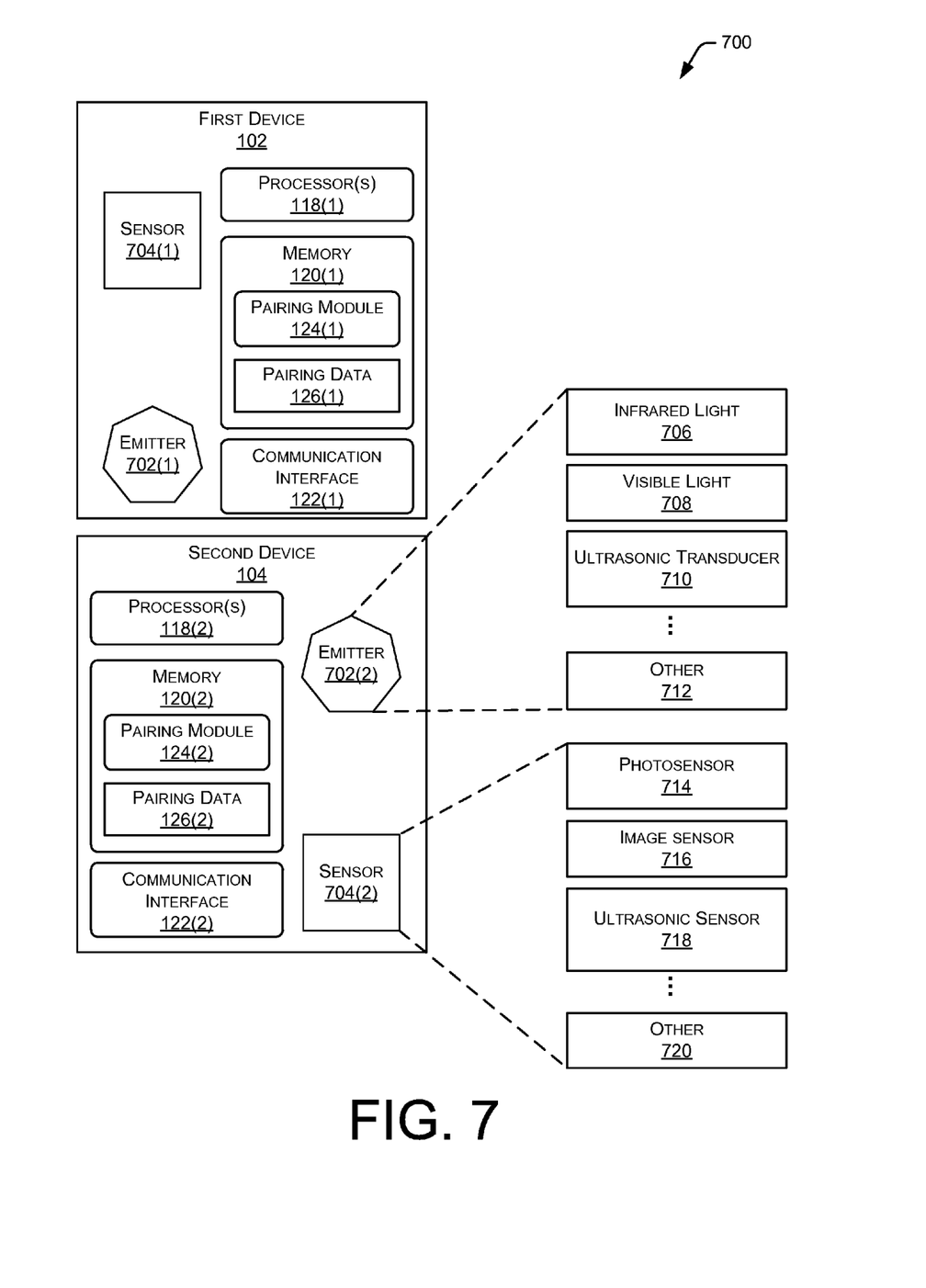
FIG. 7 illustrates devices which may use other emitters and sensors to initiate pairing based on proximity.

FIG. 7 illustrates devices 700 which may use non-magnetic emitters and sensors to initiate pairing based on proximity. As described above with regard to FIG. 1, the first device 102 and the second device 104 may comprise one or more processors 118, memories 120, pairing modules 124, and communication interfaces 122. Instead of, or in addition to the magnets 112 and the magnetic sensors 114, the devices 700 may incorporate one or more emitters 702 and sensors 704.

The emitters 702 are configured to emit a signal which may be detected by a corresponding sensor 704 of the other device. The emitter 702(2) may comprise an infrared light source 706, visible light source 708, ultrasonic transducer 710, and so forth. The infrared light 706 and the visible light 708 sources may include light emitting diodes ("LEDs"), electroluminescent devices, quantum dots, and so forth. The ultrasonic transducer 710 may comprise a piezoelectric device, microelectromechanical device, and so forth.

The emitter 702 may be configured to intermittently generate a signal or emission as controlled by the processor 118 or a device coupled to the processor 118. This signal is configured to be received by the other device to provide an indication of proximity. Other emitters 712 may also be used such as a speaker, electrostatic field generator, radio frequency identification tag, near-field communication tag, and so forth.

The sensors 704 are configured to receive the signal emitted by the corresponding emitter 702 of the other device and generate an output for the processor 118 or another device coupled to the processor 118. The sensors 704 may include a photosensor 714, an image sensor 716, or an ultrasonic sensor 718. For example, a camera comprising an image sensor 716 such as a complementary metal-oxide semiconductor ("CMOS") or charge coupled device ("CCD") may be used to detect a signal from an the infrared light 706 or visible light 708 emitter. Other sensors 720 may be used, such as capacitive sensors, microphones, radio frequency identification tag reader, near-field communication device, and so forth.

In some implementations the emitter 702 and the sensor 704 may be a common device. For example, the ultrasonic transducer 710 may be configured to generate ultrasonic signals as well as receive them.

The emitter 702 may be configured to operate at a relatively low power level such that reception by the sensor 704 occurs when proximate. For example, emitted light intensity or brightness of the infrared light 706 may be set to less than 15 milliwatts during emission of signals configured to initiate pairing. By reducing the output of the emitter 702, reception of an emitted signal may be used as an indicator of proximity with which the pairing process is initiated.

A detection threshold may be configured. Signals which are received by the sensor 704 which are above this threshold may be used, at least in part, to initiate the pairing process.

In another implementation, techniques providing distance measurement such as time of flight may be used to determine proximity. For example, when the first device 102 and the second device 104 are determined to be 6 inches or less from one another based on ultrasonic time of flight, the pairing may be initiated. In yet another implementation, the housing 404 of the first device 102, the second device 104, or both may be configured such that the emitter 702 and the sensor 704 of the opposing devices are in communication when placed in a particular arrangement.

The emitters 702 and the sensors 704 may differ between the devices 700. For example, the emitter 702(1) of the first device 102 may be an optical emitter while the sensor 704(1) is a magnetic sensor 114. Continuing the example, the sensor 704(2) of the second device 102 may comprise an infrared photosensor 714 while the emitter 702(2) may comprise a magnet 112.

Illustrative Processes

Figure 8:
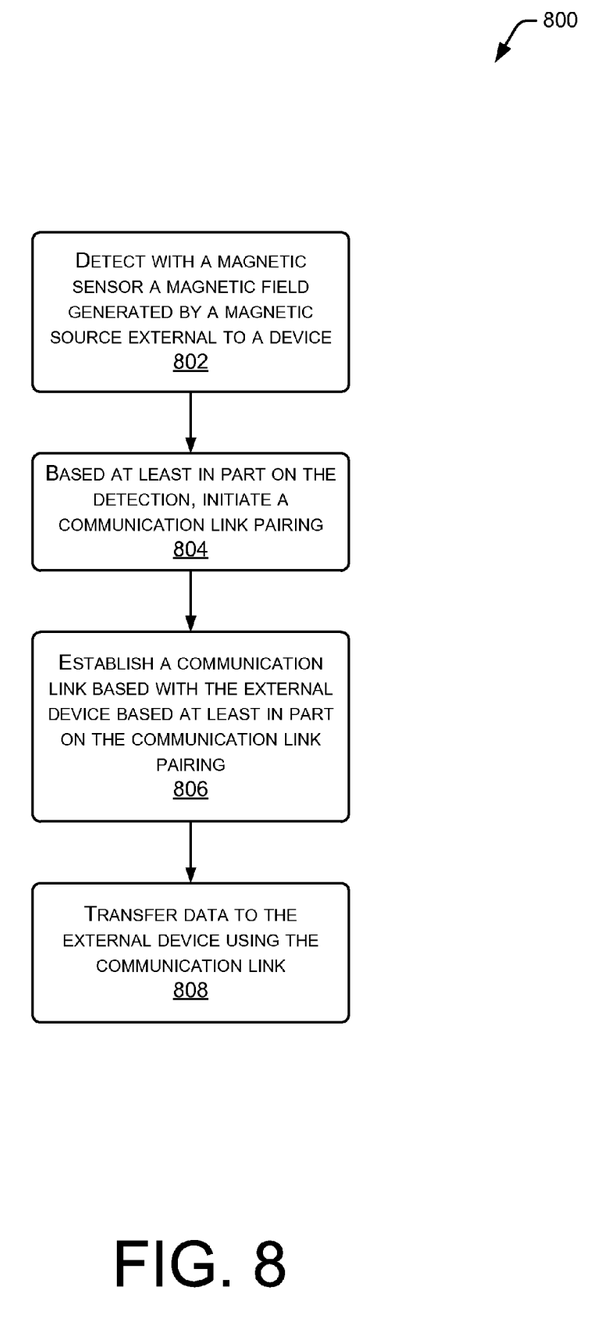
FIG. 8 illustrates a process for magnetically initiating device pairing between a first and second device.

FIG. 8 illustrates a flow diagram 800 of a process for magnetically initiating device pairing between the first device 102 and the second device 104. The process may be implemented at least in part by the pairing module 124 of the first device 102, the second device 104, or both devices.

Block 802 detects with the magnetic sensor 114 the magnetic field 116 as generated by the magnet 112 external to the first device 102 and associated with the second device 104. In other implementations, as described above with respect to FIG. 7 signals other than, or in addition to, magnetic fields may be used to determine proximity of the first device 102 and the second device 104.

Based at least in part on the detection, block 804 initiates a communication link pairing with the second device 104 using the communication interface 122. The communication interface 122 may include a radio frequency communication interface compatible with a PAN, such as the Bluetooth™ standard.

Block 806 establishes a communication link 128 with the paired second device 104 using the communication interface 122.

Block 808 transfers data to the second device 104 using the communication link 128. For example, the second device 104 may send the first device 102 user input received from buttons on the second device 104.

Figure 9:
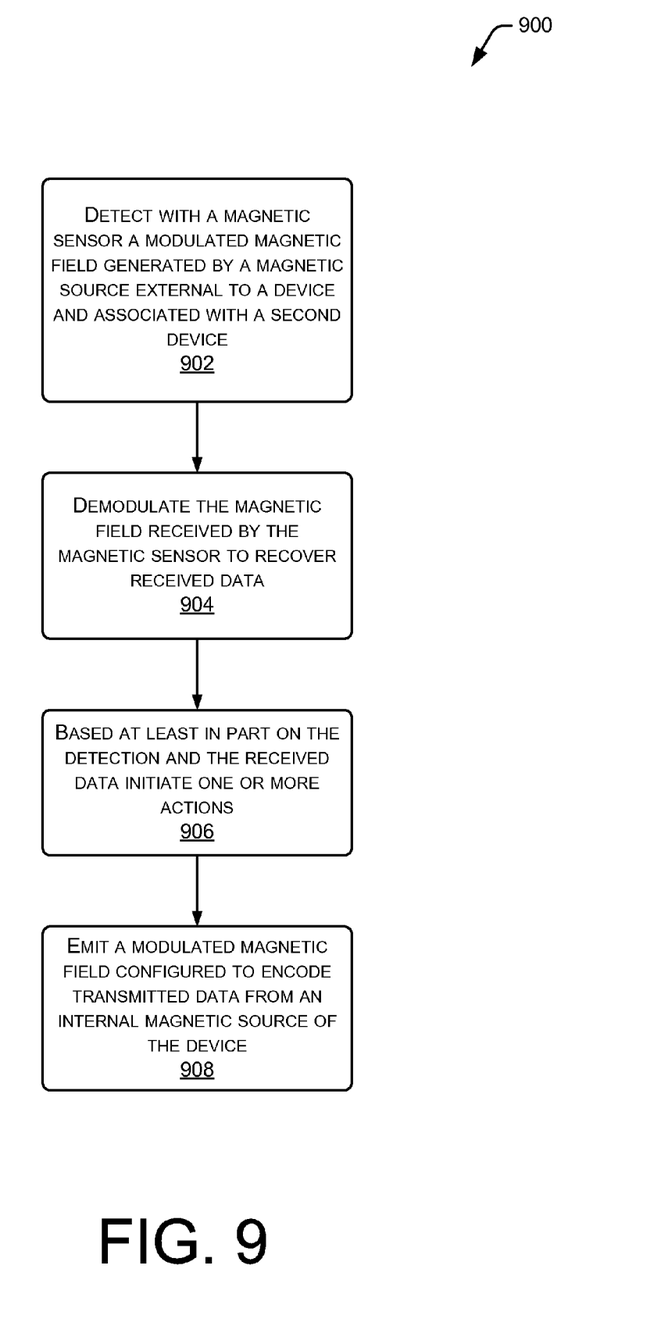
FIG. 9 illustrates a process for magnetically initiating device pairing between a first and second device using modulated magnetic fields.

FIG. 9 illustrates flow diagram 900 of a process for magnetically initiating device pairing between a first and second device using modulated magnetic fields. The process may be implemented at least in part by the pairing module 124 of the first device 102, the second device 104, or both devices.

Block 902 detects, with the magnetic sensor 114, a modulated magnetic field 116 generated by a magnetic source external to the first device 102 and associated with the second device 104. The magnetic source may comprise the permanent magnet 302, electromagnet 304, the electro-permanent magnet 306, and so forth. In other implementations where non-magnetic signals are used, such as the emitter 702, the emitter 702 may be configured to emit a modulated signal.

Block 904 demodulates the magnetic field 116 received by the magnetic sensor 114 to recover received data. The data may comprise encoded data such as one or more encryption keys or passwords associated with the communication link pairing. In other implementations where non-magnetic signals are used, the received data may be recovered from the signal received by the sensor 704

Based at least in part on the detection and the received data, block 906 initiates one or more actions. In one implementation the actions may include initiating the communication link pairing with the second device 104 using the communication interface 122. The one or more actions may include activating a particular communication interface 122, emitting a signal, and so forth.

In some implementations, block 908 may emit a modulated magnetic field 116 configured to encode transmitted data from an internal magnetic source of the device. In one implementation the transmitted data may include one or more encryption keys or passwords. The modulated magnetic field 116 may be generated by rotating one or more of the magnets 112 in a pre-determined pattern.

In other implementations the non-magnetic emitters 702 and sensors 704 may be used to determine proximity of the first device 102 and the second device 104.

Figure 10:
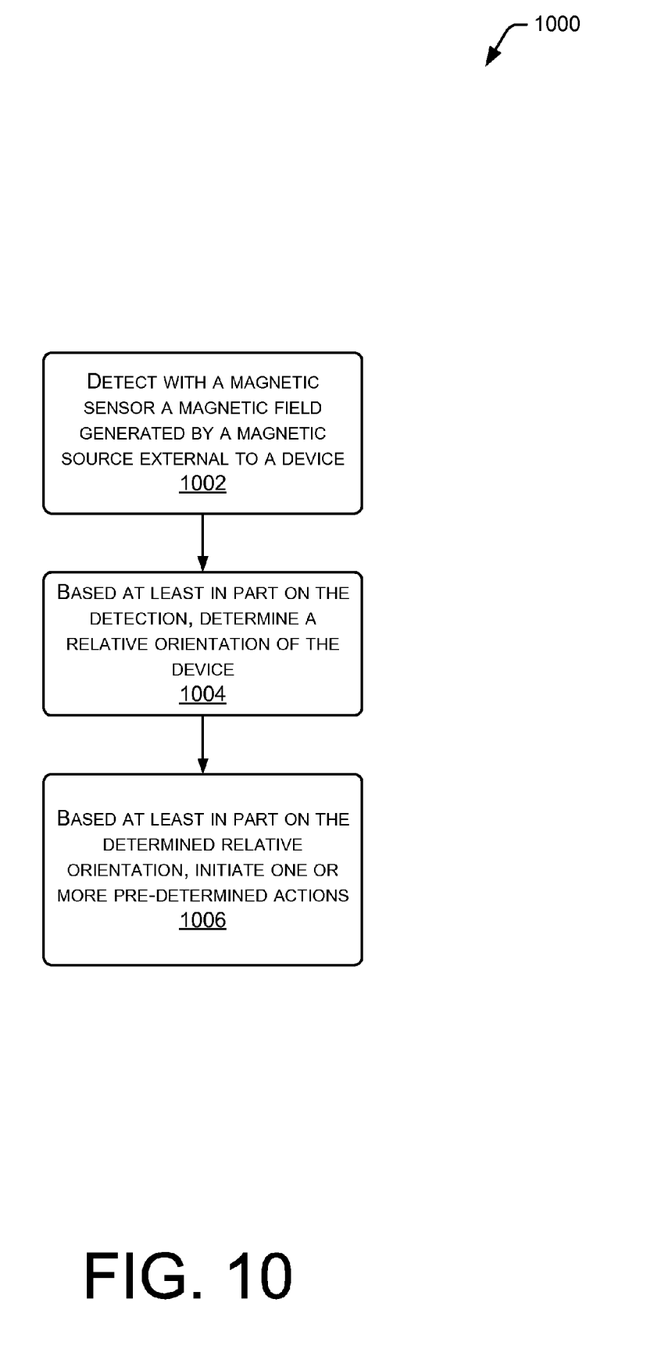
FIG. 10 illustrates a process for initiating one or more pre-determined actions based at least in part on a relative orientation between the first and second devices.

FIG. 10 illustrates a flow diagram 1000 of a process for initiating one or more pre-determined actions based at least in part on a relative orientation between the first device 102 and the second device 104. As described above with regard to FIG. 5, the relative orientation describes the spatial relationship between the first device 102 and the second device 104. Different relative orientations may be used to initiate different actions. For example, a first orientation may initiate the pairing process while a second orientation may place one or both of the devices into a low power mode. The relative orientation may be determined based at least in part on the magnetic field 116 as detected by the magnetic sensor 114. The process may be implemented at least in part by the first device 102, the second device 104, or both devices.

Block 1002 detects with the magnetic sensor 114 the magnetic field 116 generated by a magnetic source external to the first device 102, such as the magnet 112(2) of the second device 104.

Based at least in part on the detection, block 1004 determines a relative orientation of the first device 102 with respect to the second device 104. For example, both devices are facing the same direction. This determination may be made based on the positioning of the one or more magnetic sensors 114 to provide data indicating a relative orientation of the second device 104, such as described above with regard to FIG. 5. In another implementation, additional data such as vector information about the magnetic field may be obtained, such as when the magnetic sensor 114 comprises the Hall sensors 310. In this implementation, the direction of the magnetic field 116 may be determined and used to determine the relative orientation.

Based at least in part on the determined relative orientation, block 1006 initiates one or more pre-determined actions. A lookup table which associates particular actions with particular orientations may be used by the device in some implementations. For example, a relative orientation of facing the same direction may result in initiating the pairing process while facing the opposite direction may result in entry to a low power mode.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device comprising:
    one or more magnets configured to generate a first magnetic field;
    one or more magnetic sensors configured to detect a modulated second magnetic field;
    a radio frequency communication interface;
    at least one memory storing computer-executable instructions; and
    at least one processor coupled to the one or more magnetic sensors, the radio frequency communication interface, and configured to access the at least one memory and execute the computer-executable instructions to:
        detect with the magnetic sensor the second magnetic field as generated by a magnet external to the device and associated with a second device;
        demodulate the second magnetic field received by the magnetic sensor to recover received data;
        based at least in part on the detection and the received data, initiate a communication link pairing with the second device using the radio frequency communication interface; and
        establish a communication link with the paired second device using the radio frequency communication interface.

2. The device of claim 1, the one or more magnets comprising one or more of a permanent magnet, an electromagnet, or an electro-permanent magnet.

3. The device of claim 1, the one or more magnetic sensors comprising one or more of a reed switch, a Hall-effect sensor, a microelectromechanical system magnetic sensor, or a magnetic tunnel junction.

4. The device of claim 1, wherein the radio frequency communication interface is configured to couple to a personal area network.

5. A device comprising:
    one or more magnets;
    one or more magnetic sensors;
    a communication interface;
    at least one memory storing computer-executable instructions; and
    at least one processor coupled to the one or more magnetic sensors, the communication interface, and configured to access the at least one memory and execute the computer-executable instructions to:
        detect with the magnetic sensor a modulated magnetic field as generated by a magnet external to the device and associated with a second device;
        demodulate the magnetic field received by the magnetic sensor to recover received data; and
        based at least in part on the detection and the received data, initiate a communication link pairing with the second device using the communication interface.

6. The device of claim 5, the communication interface comprising a radio frequency communication interface compatible with the Bluetooth™ standard.

7. The device of claim 5, further comprising instructions to establish a communication link with the paired second device using the communication interface.

8. The device of claim 5, further comprising:
    a housing comprising a trigger area within which a portion of the second device is configured to be placed proximate to such that, when proximate, the one or more magnetic sensors detects the magnet associated with the second device and such that a magnetic field from the one or more magnetic sources impinges upon a magnetic sensor associated with the second device.

9. The device of claim 8, the trigger area comprising a recess in the housing configured to accept at least a portion of a housing of the second device.

10. The device of claim 8, the trigger area comprising a protrusion in the housing configured to fit at least partially within a recess in a housing of the second device.

11. The device of claim 5, wherein the one or more magnetic sensors are configured to provide data indicating a relative orientation of the second device.

12. The device of claim 11, further comprising instructions to:
    determine a second relative orientation of the second device based at least in part on the one or more magnetic sensors; and
    based at least in part on the relative orientation, initiating a pre-determined action.

13. The device of claim 12, the pre-determined action comprising a transition to a reduced power mode of one or more of the at least one processor, the communication interface, or the magnetic sensor.

14. A device comprising:
one or more magnets;
one or more magnetic sensors;
a communication interface;
at least one memory storing computer-executable instructions; and
at least one processor coupled to the one or more magnetic sensors, the communication interface, and configured to access the at least one memory and execute the computer-executable instructions to:
  detect with the magnetic sensor a modulated magnetic field as generated by a magnet external to the device and associated with a second device;
  demodulate the magnetic field received by the magnetic sensor to recover received data; and
  based at least in part on the detection and the received data, initiate a communication link pairing with the second device using the communication interface.

15. The device of claim 14, the received data comprising an encryption key associated with the communication link pairing.

16. The device of claim 14, wherein the one or more magnets are configured to generate a modulated magnetic field, the instructions further configured to emit a modulated magnetic field from the one or more magnets, the modulated magnetic field configured to encode transmitted data.

17. The device of claim 16, wherein the one or more magnets are configured to generate the modulated magnetic field by rotating one or more of the magnets in a pre-determined pattern.

18. The device of claim 16, the transmitted data comprising an encryption key associated with the communication link pairing.

19. The device of claim 14, the communication interface configured to couple to or provide a wireless personal area network.

20. The device of claim 14, the one or more magnetic sensors comprising one or more of a reed switch, a Hall-effect sensor, a microelectromechanical system magnetic sensor, or a magnetic tunnel junction.

21. A first device comprising:
one or more sensors;
a communication interface;
at least one memory storing computer-executable instructions; and
at least one processor coupled to the one or more sensors, the communication interface, and configured to access the at least one memory and execute the computer-executable instructions to:
  detect with the sensor a modulated signal generated by an emitter external to the first device and associated with a second device;
  demodulate the signal received by the sensor to recover received data;
  determine the second device is proximate to the first device based at least in part on the detected signal; and
  based at least in part on the detection and the received data, initiate a communication link pairing with the second device using the communication interface.

22. The device of claim 21, the one or more sensors a photo detector, image sensor, or ultrasonic sensor.

23. The device of claim 21, further comprising one or more emitters coupled to the at least one processor, wherein the one or more emitters are configurable to emit a signal detectable by a corresponding detector in the second device, and further wherein the one or more emitters comprise an infrared light, a visible light, or an ultrasonic transducer.

* * * * *